(12) United States Patent
Leng

(10) Patent No.: US 6,467,822 B1
(45) Date of Patent: Oct. 22, 2002

(54) BUMPER SUPPORT FOR IMPROVED PEDESTRIAN PROTECTION IN MOTOR VEHICLES

(75) Inventor: Robert Leng, Weibenburg (DE)

(73) Assignee: Dynamit Nobel Kunststoff GmbH, Weibenburg (DE)

( * ) Notice: Subject to any disclaimer, the term of this patent is extended or adjusted under 35 U.S.C. 154(b) by 5 days.

(21) Appl. No.: 09/624,596

(22) Filed: Jul. 25, 2000

(30) Foreign Application Priority Data

Jul. 26, 1999 (DE) .......................................... 199 34 141

(51) Int. Cl.⁷ ............................................... B60R 19/03
(52) U.S. Cl. ........................ 293/121; 293/115; 293/109
(58) Field of Search ................................ 293/115, 135, 293/136, 121, 109; 296/189

(56) References Cited

U.S. PATENT DOCUMENTS

| 3,692,345 A | | 9/1972 | Dumontier |
| 3,869,164 A | * | 3/1975 | Schwenk |
| 4,106,804 A | * | 8/1978 | Scrivo |
| 4,119,339 A | | 10/1978 | Heimburger |
| 4,542,925 A | * | 9/1985 | Huber et al. |
| 5,139,304 A | * | 8/1992 | Tajiri |
| 5,984,389 A | * | 11/1999 | Nuber et al. |
| 6,106,039 A | * | 8/2000 | Maki |

FOREIGN PATENT DOCUMENTS

| DE | 2927035 | 1/1981 |
| DE | 3003568 | 8/1981 |
| DE | 3051041 | 8/1981 |
| DE | 4401643 | 8/1994 |
| DE | 19508039 | 9/1996 |
| FR | 2758114 | 7/1998 |

* cited by examiner

Primary Examiner—D. Glenn Dayoan
Assistant Examiner—Scott Carpenter
(74) Attorney, Agent, or Firm—Antonelli, Terry, Stout & Kraus, LLP

(57) ABSTRACT

The invention relates to a vehicle with an energy-absorbent structure (1) and with a spoiler (2) made in one piece with the bumper or fastened thereto. To improve protection of pedestrians, it is proposed that spoiler (2) be limited in its deflection lengthwise of the vehicle by a support (3) mounted on the vehicle, with support (3) being located a radial distance behind spoiler (2).

7 Claims, 2 Drawing Sheets

BUMPER SUPPORT FOR IMPROVED PEDESTRIAN PROTECTION IN MOTOR VEHICLES

BACKGROUND OF THE INVENTION

The invention relates to a bumper system for a motor vehicle with an energy-absorbent structure and a spoiler made in one piece with the bumper or fastened thereto.

In years past, bumper systems were improved primarily for better Cw value, lower repair costs, and improved crash behavior (ECE 42, Allianz test up to 15 km/h).

Additional passive safety measures such as airbags and the like provide only self-protection but not for others, especially not for pedestrians.

SUMMARY OF THE INVENTION

The relatively severe injuries in accidents involving pedestrians are caused firstly by being run over and secondly by the fact that the pedestrian has his leg under the vehicle while the upper body strikes the hood. Because of this bending, complex injuries with permanent damage involve the knee area in particular.

The goal of the invention is to improve a bumper system for motor vehicles so that pedestrian protection is considerably improved.

According to the invention, this goal is achieved by the fact that the spoiler is limited in its deflection lengthwise of the vehicle by a support mounted on the vehicle, with the support being located a radial distance behind the spoiler.

When a pedestrian strikes the bumper, a portion of the impact energy is absorbed by the bumper with its energy-absorbent structure. The spoiler is then displaced lengthwise of the vehicle until it contacts the support. As a result, the leg of a pedestrian is not trapped under the vehicle and the bending angle is kept small.

If a cross member with a mounting support is located between the lengthwise members of the vehicle, the support is advantageously fastened to the mounting support.

If no transverse member is provided, the support is advantageously fastened to the lengthwise members.

Advantageously, the end of the support facing the spoiler is designed to cover the same area as the spoiler so that as large an area as possible is available for support. It also suffices for the end of the support to fit the shape of the spoiler.

Advantageously, the support extends in one piece over almost the entire width of the vehicle so that the spoiler is supported everywhere.

Depending on the design of the front end, the support according to the invention consists of sheet metal, plastic, or a hybrid.

In a preferred embodiment, the energy-absorbent structure is a foam.

The bumper system according to the invention is especially suitable for automobiles.

BRIEF DESCRIPTION OF THE DRAWINGS

Further features of the invention are shown in the figures described below.

DETAILED DESCRIPTION OF THE PREFERRED EMBODIMENTS

Figure 1:
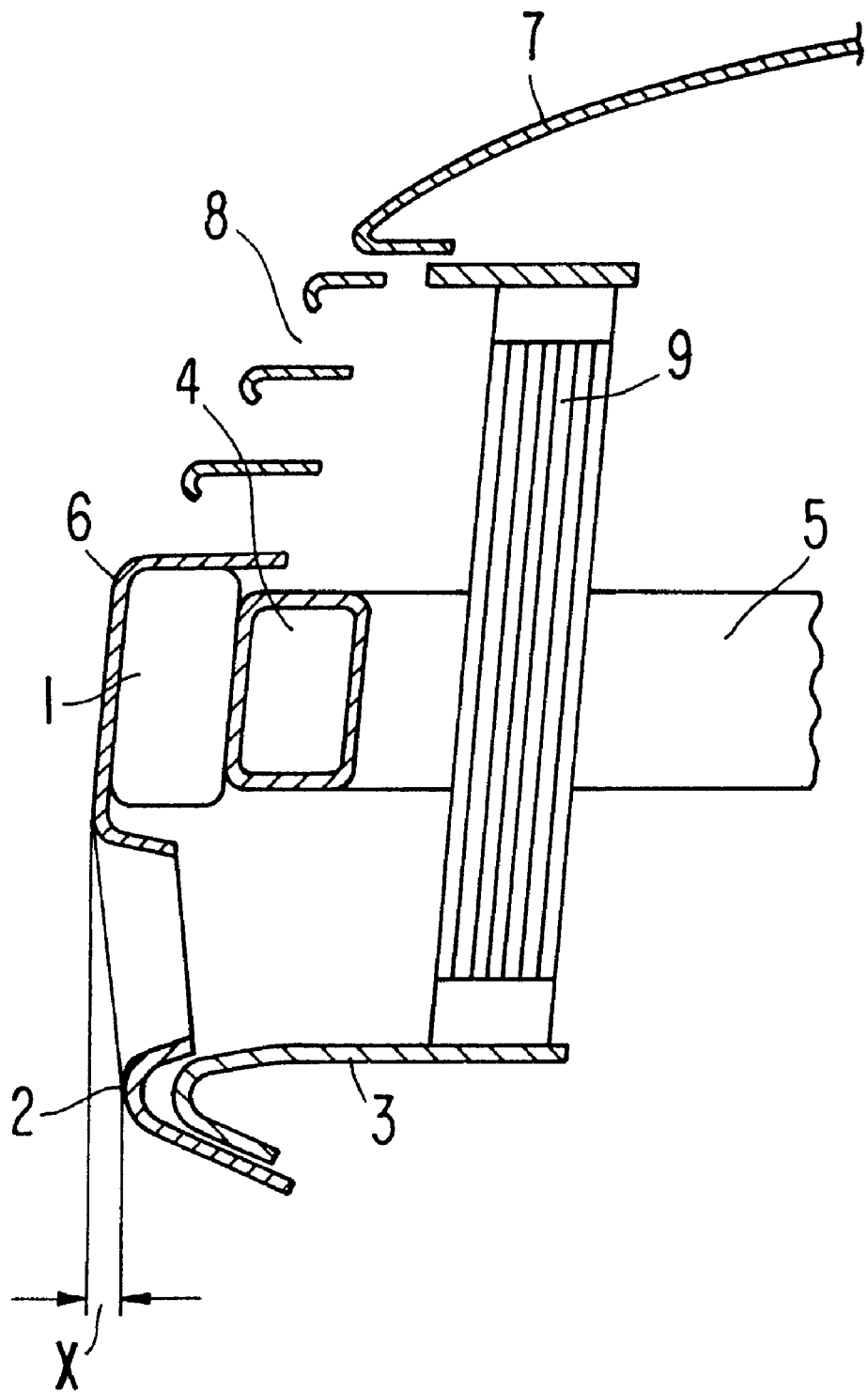
FIG. 1 is a section through a motor vehicle front end with support for the spoiler according to the invention.

FIG. 1 shows in a section, a front end of a motor vehicle or automobile. Between lengthwise members 5, with a transverse member 4 located in front of which an energy-absorbent structure 1 is located that consists of foam. The outer skin 6 of the bumper surrounds the energy-absorbing structure 1 and also forms the spoiler 2 located beneath. In addition, the engine hood 7, ventilation slits 8, and radiator 9 are indicated schematically.

According to the invention, spoiler 2 is delimited by a support 3 in its deflection lengthwise of the vehicle. The lengthwise direction of the vehicle is the length of lengthwise member 5. Support 3 is located with a radial spacing behind the spoiler. Dimension x indicates the deflection of spoiler 2 until it abuts support 3.

In a collision with a pedestrian, a portion of the energy is absorbed by the bumper with the foam while in the lower area, spoiler 2 moves rearward toward the back of the vehicle. The radial distance x decreases until spoiler 2 abuts support 3. As a result, the leg of the pedestrian does not become trapped under the vehicle. Depending on the design, the support of the front end can be made of sheet metal, plastic, or a hybrid.

Figure 2:
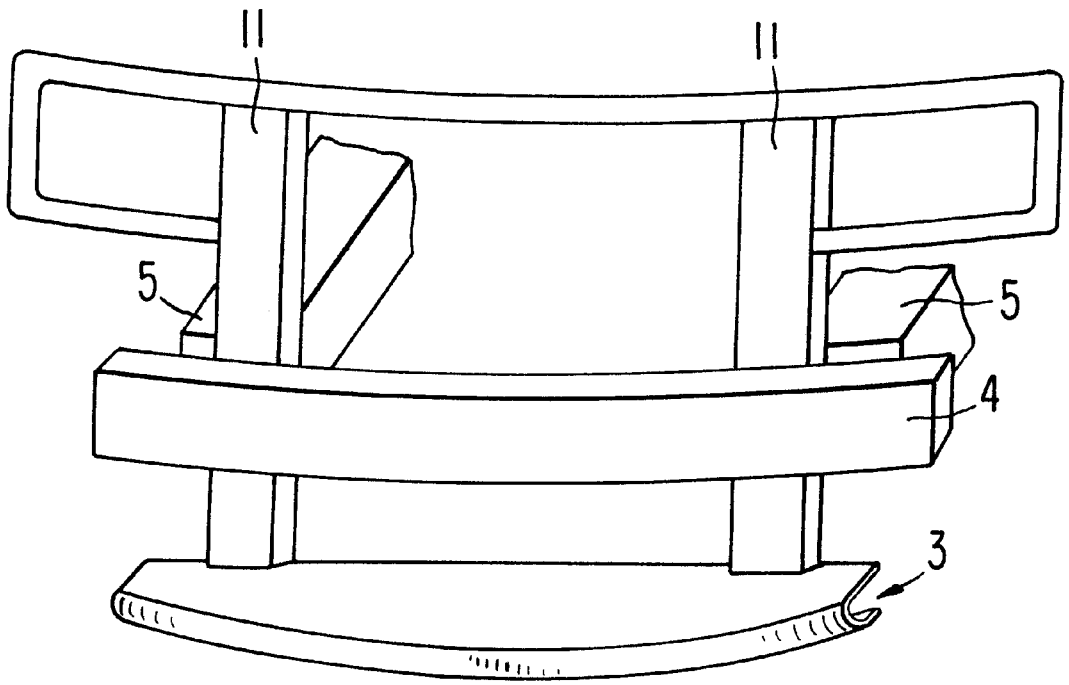
FIG. 2 is an embodiment with the support fastened on the mounting beam.

FIG. 2 shows an embodiment in which support 3 is fastened to mounting support 11 located between transverse member 4 and lengthwise members 5.

Figure 3:
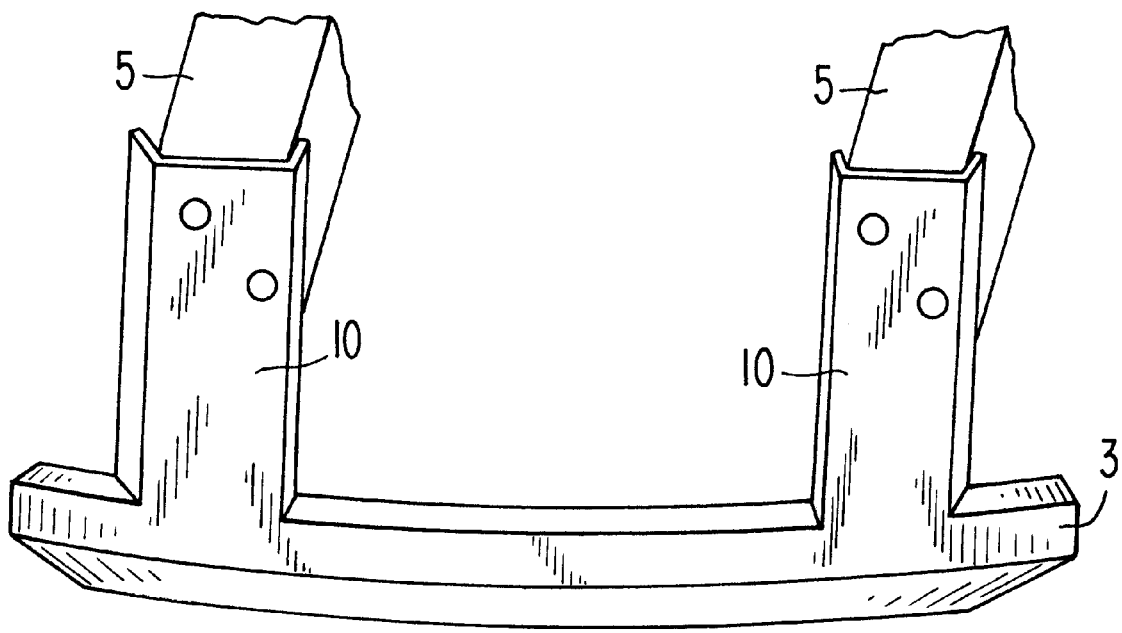
FIG. 3 shows a support according to the invention for fastening to the lengthwise members.

FIG. 3 shows an embodiment of support 3 for direct mounting on the lengthwise members. This is necessary when no mounting support 11 is provided. The support is fastened by mount 10 to lengthwise members, for example by screws.

What is claimed is:

1. A bumper system for a motor vehicle, comprising an energy-absorbent structure, a bumper skin provided on the energy-absorbent structure, a spoiler made in one piece with the bumper skin or fastened thereto, and a support mounted on the vehicle, with the support being located at a radial distance behind spoiler so that the spoiler is freely moveable rearwardly through the radial distance before the spoiler contacts the support.

2. A bumper system according to claim 1 with a transverse member, lengthwise members, and a mounting support and characterized in that the support is fastened to said mounting support located between the transverse member and lengthwise members.

3. A bumper system according to claim 1 including lengthwise members and characterized in that said support is fastened to said lengthwise members.

4. A bumper system according to claim 1 characterized in that the end of the support facing the spoiler covers the same area as said spoiler.

5. A bumper system according to claim 1 characterized in that the support extends in one piece over almost the entire width of the vehicle.

6. A bumper system according to claim 1 characterized in that the support is made of sheet metal, plastic, or a hybrid.

7. A bumper system according to claim 1 characterized in that the energy-absorbent structure is a foam.

* * * * *